C. H. RUGGLES.
LOG AND LUMBER CAR.
APPLICATION FILED MAY 6, 1909.
986,315.
Patented Mar. 7, 1911.
2 SHEETS—SHEET 1.
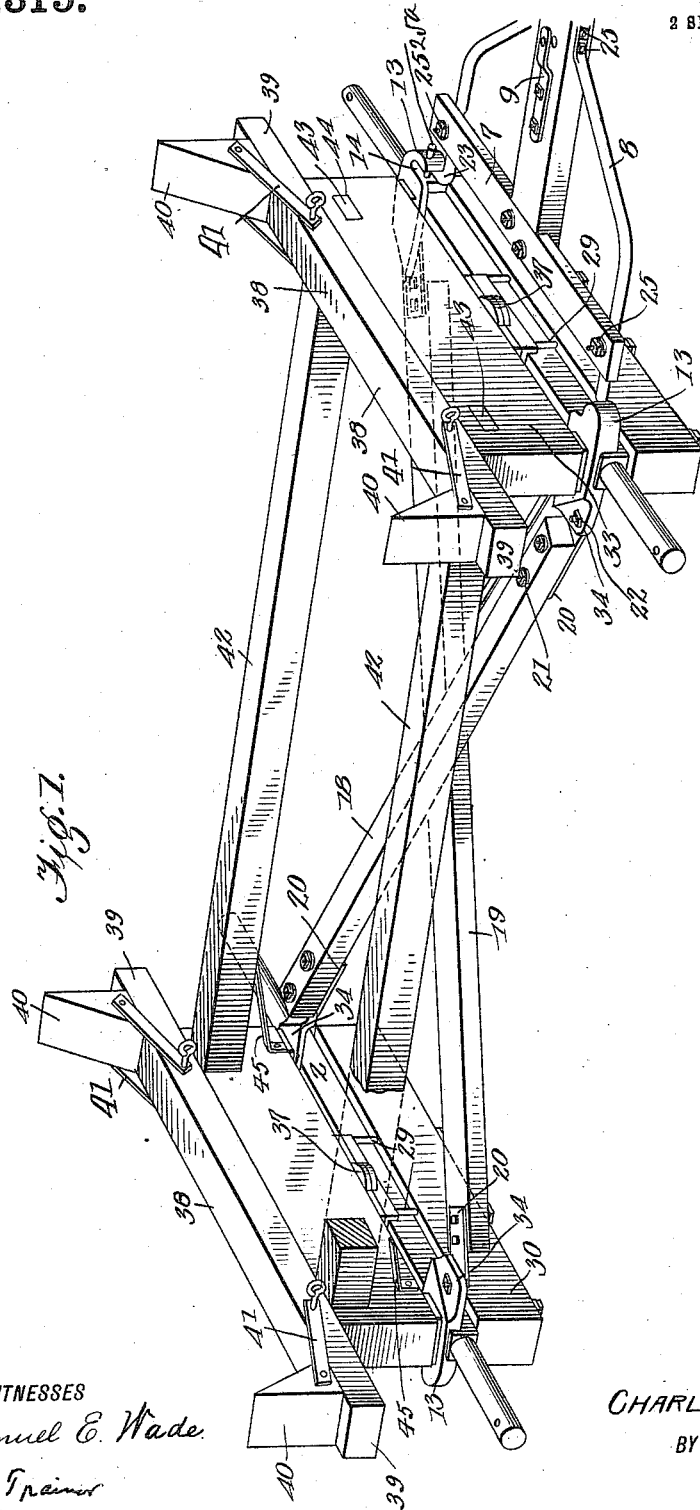
WITNESSES
Samuel E. Wade
C. E. Trainor
INVENTOR
CHARLES H. RUGGLES
BY Munn & Co.
ATTORNEYS

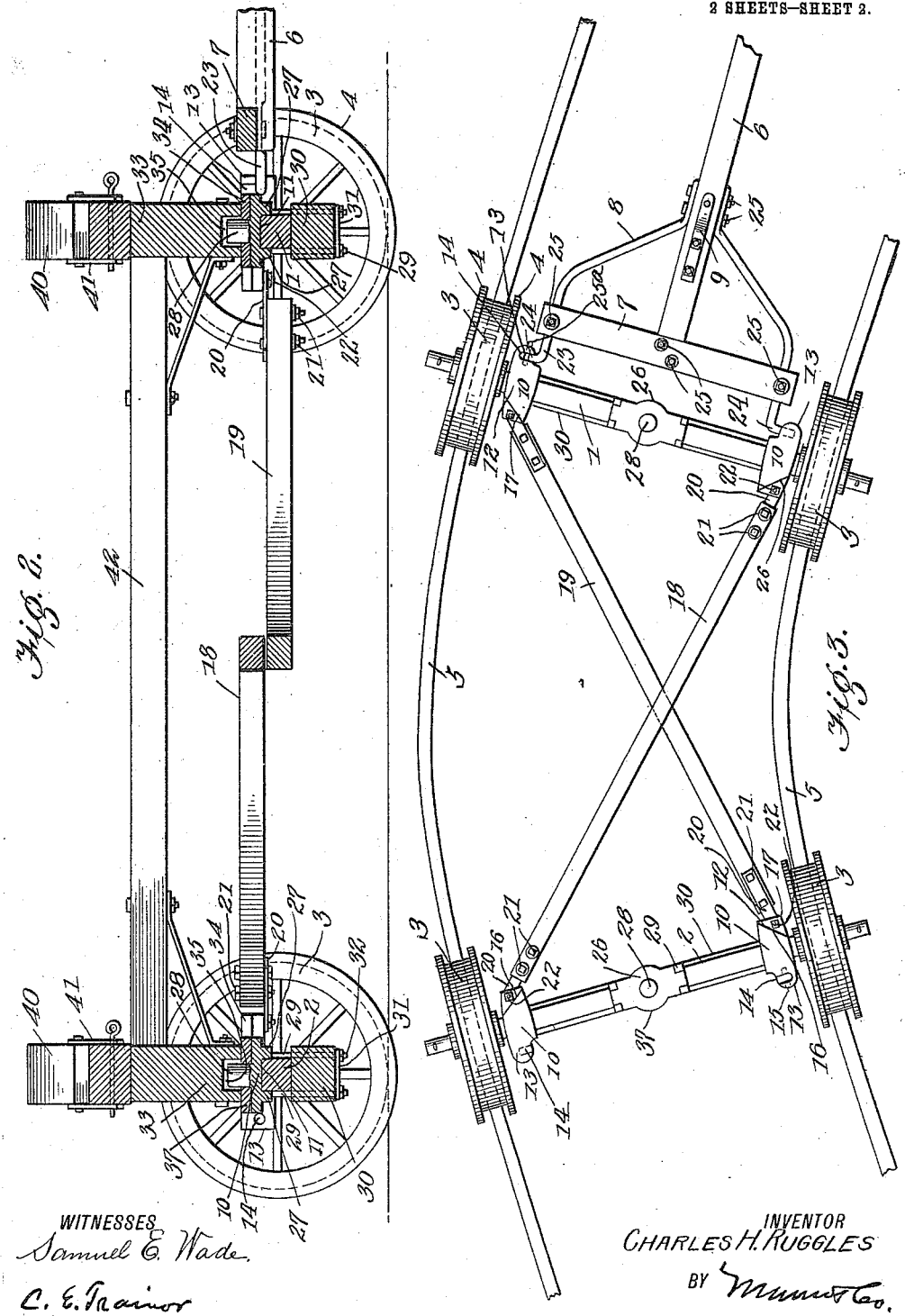

UNITED STATES PATENT OFFICE.

CHARLES H. RUGGLES, OF HOPE, ARKANSAS.

LOG AND LUMBER CAR.

986,315.                    Specification of Letters Patent.    Patented Mar. 7, 1911.

Application filed May 6, 1909. Serial No. 494,215.

*To all whom it may concern:*

Be it known that I, CHARLES H. RUGGLES, a citizen of the United States, and a resident of Hope, in the county of Hempstead and State of Arkansas, have made certain new and useful Improvements in Log and Lumber Cars of which the following is a specification.

My invention is an improvement in log and lumber cars, and consists in certain novel constructions and combinations of parts hereinafter described and claimed.

The object of the invention is to provide a car especially adapted for use in logging and lumber railways, and consisting of a rigid frame, on which the load is carried, supported by a flexible frame.

Referring to the drawings forming a part hereof, Figure 1 is a perspective view of the car, with the wheels removed, Fig. 2 is a central longitudinal section, and Fig. 3 is a plan view, the rigid frame being removed.

The embodiment of the invention shown in the drawings, consists of a front axle 1, and a rear axle 2, each of which is provided at its ends with a wheel 3, the wheels being flanged on both sides or at 4 and traveling upon the rails 5.

A tongue 6 is connected to the front axle, by means to be presently described, the tongue having at its end adjacent to the car a cross bar 7, and the cross bar is braced to the tongue by braces 8, and provided with the usual clevis 9.

Each of the axles 1 and 2 are of the same shape and construction, being square in cross section as shown, and near each end inside the wheels, is arranged a plate 10, transversely thereof, the plate being recessed as at 11 for receiving the axle.

The plate extends on both sides of the axle as at 12—13, and the outer end 13, is provided with a circular recess 14, parallel with the axle, and a transverse opening 15 intersecting the recess, and the inner end 12 of the plate has its upper surface cut away as at 16 to form an ear 17 for a purpose to be presently described.

Reach bars 18 and 19 are arranged diagonally of the car, each being square in cross section as shown, and the bars have bolted to each end thereof a plate 20 by bolts 21, and the free end of the plate is connected to the adjacent ear of a plate 10, by a bolt 22, the plates being on the upper face of the bar 19 and on the lower face of the bar 18.

The ends of the braces 8 connecting the ends of the cross bar 7 with the tongue are extended beyond the cross bar as at 23, and the free end of each is bent outwardly to form a trunnion 24 for engaging a recess 14. The trunnion is provided with a transverse opening registering with the opening 15, and a pin 25ᵃ traverses the openings for securing the trunnion in place.

It will be evident from the above description, that the tongue may be used at either end of the car, and may be removed and replaced by disengaging the trunnions from the recesses of the plates at one end of the car and inserting them in the recesses of the plates at the other end. The tongue, the cross bar, and the braces, are firmly connected by bolts 25, and the extended ends of the braces are sufficiently resilient to permit them to be sprung into and out of the recesses.

A plate 26 is arranged at the center of each axle, and is provided with spaced parallel flanges 27, on its lower face, between which the axle is received, and upon its upper face with a center pin or king bolt 28, the bolt being preferably integral with the plate. The plate is secured to the axle by bolts 29, passing through openings at each corner thereof, and along the sides of the axle to registering openings in bars 30 of wood or similar material arranged below the axles, and extending substantially the full length thereof inside the wheels.

The ends of the bolts pass through the ends of straps 31, arranged transversely of the lower face of the bars, and are engaged by nuts 32, for securing the parts together.

A bolster 33, is pivotally mounted on each axle, each bolster having secured to its lower edge at the center thereof, a plate 34, provided with a central opening for receiving the king bolt, and the bolster is recessed for the same purpose as at 35. The plate is secured to the bolster in any suitable manner, and both the plates 26 and 34, are enlarged laterally around the king bolt to form a rubbing surface 37.

The upper face of each of the corner plates 10 is flat as shown, and each end of the bolsters is provided with a coöperating plate or shoe resting upon the flat face of the corner plate.

Each bolster has secured to the upper face thereof in any suitable manner, a bar 38, extending above and outside of the wheels as at 39, and each end of the bars is provided with a swinging chock block 40, the block being connected to the bar by straps 41 on each side thereof and pivoted to both parts.

The bolsters are connected together to form a rigid frame by coupling bars 42, whose ends are provided with tenons 43, received in mortises 44 in the bolsters, and the bars are braced against the bolsters by braces 45 at each end thereof.

It will be evident from the description, that the car is reversible, the construction at one end being an exact duplicate of the construction at the other end. It will also be evident that the car consists substantially of two frames, a lower flexible frame, and an upper rigid frame, the former composed by the axles and reach bars, and the latter by the bolsters and bars 42.

The car is especially adapted for the short curves, and crude construction of logging railways, the axles being flexibly connected in such a manner that the pairs of wheels are permitted to take positions very much inclined with respect to each other, and without disturbing the arrangement of the load which is supported by the rigid frame.

In rounding a curve, the reach bars move freely past each other, one being arranged at a higher level than the other, and the connections of their ends with the axle being pivotal.

I claim,

1. A car of the character specified, comprising a flexible frame and a rigid frame supported thereby, axles in connection with the flexible frame, each of said axles having near each end thereof a transverse plate provided on the outer side of the axle with lateral recesses, said recesses opening inwardly, and a tongue having lateral braces, whose ends are bent outwardly to form trunnions for engaging the adjacent recess.

2. A car of the character specified, comprising a flexible frame and a rigid frame supported thereby, axles in connection with the flexible frame, each of said axles having near each end thereof a transverse plate provided on the outer side of the axle with lateral recesses, said recesses opening inwardly, and a tongue having lateral braces, whose ends are bent outwardly to form trunnions for engaging the adjacent recess, and reach bars pivoted to the opposite ends of the plates, said reach bars being arranged in crossed relation.

3. A car of the character specified, comprising a flexible frame and a rigid frame supported thereby, axles in connection with the flexible frame, each of said axles having near each end thereof a transverse plate provided on the outer side of the axle with lateral recesses, said recesses opening inwardly, and a tongue having lateral braces, whose ends are bent outwardly to form trunnions for engaging the adjacent recess, and reach bars pivoted to the opposite ends of the plates, said reach bars being arranged in crossed relation, bolsters in connection with the rigid frame, and wear plates on the ends of the bolsters coöperating with said first named plates.

4. In a car of the character specified, front and rear axles, a transverse plate at each end of each axle, said plates extending on both sides of the axle, and provided in their outer ends with lateral recesses opening inwardly for the purpose specified, and in their inner ends with reduced portions and reach bars pivoted to the said reduced portions.

CHARLES H. RUGGLES.

Witnesses:
 T. R. KING,
 A. B. GORDON.

---

Copies of this patent may be obtained for five cents each, by addressing the "Commissioner of Patents, Washington, D. C."